United States Patent [19]

Savanella

[11] Patent Number: 4,530,022
[45] Date of Patent: Jul. 16, 1985

[54] APPARATUS AND METHOD FOR PROTECTING DISKS IN A COMPUTER PERIPHERAL SYSTEM

[75] Inventor: Richard V. Savanella, Thornton, Colo.

[73] Assignee: Amcodyne Incorporated, Longmont, Colo.

[21] Appl. No.: 439,189

[22] Filed: Nov. 4, 1982

[51] Int. Cl.³ .............................................. G11B 5/012
[52] U.S. Cl. ..................................... 360/97; 360/98; 360/133
[58] Field of Search .................................. 360/97–99, 360/133

[56] References Cited

U.S. PATENT DOCUMENTS

| | | | |
|---|---|---|---|
| 4,002,826 | 1/1977 | Iemenschot | 360/99 X |
| 4,250,528 | 2/1981 | Oda | 360/99 X |
| 4,308,041 | 12/1981 | Ellis et al. | 360/97 X |
| 4,358,803 | 11/1982 | Van Der Giessen | 360/99 |
| 4,459,628 | 7/1984 | Barton | 360/97 X |

Primary Examiner—John H. Wolff
Attorney, Agent, or Firm—Sheridan, Ross & McIntosh

[57] ABSTRACT

A way is provided for protecting disks used in a computer peripheral system from contamination while allowing for purging air flow through the system during operation. When no cartridge is in the system a seal is in sealing engagement around a hub in a housing of the system preventing contamination from contacting a disk in the system and preventing the clean air from leaking out of the housing. With the cartridge in the system, a seal is formed between the cartridge and the housing preventing contamination from entering into the system thus protecting disks in the system from contamination and at the same time opening passageways so that purging air may be passed through the system.

9 Claims, 10 Drawing Figures

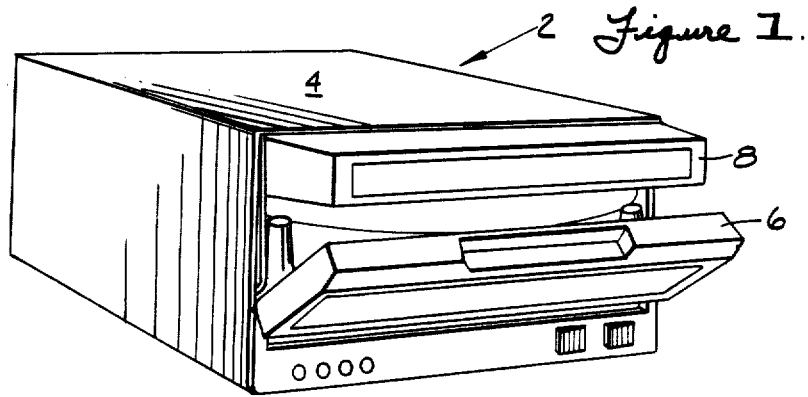
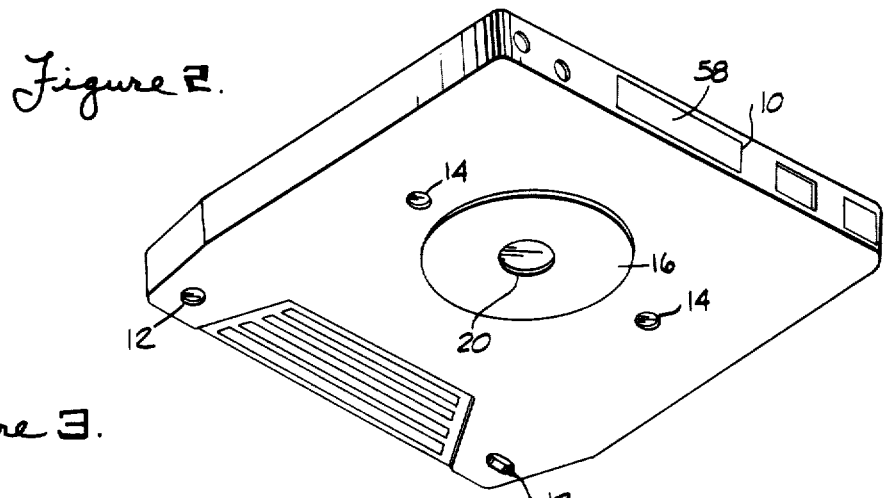
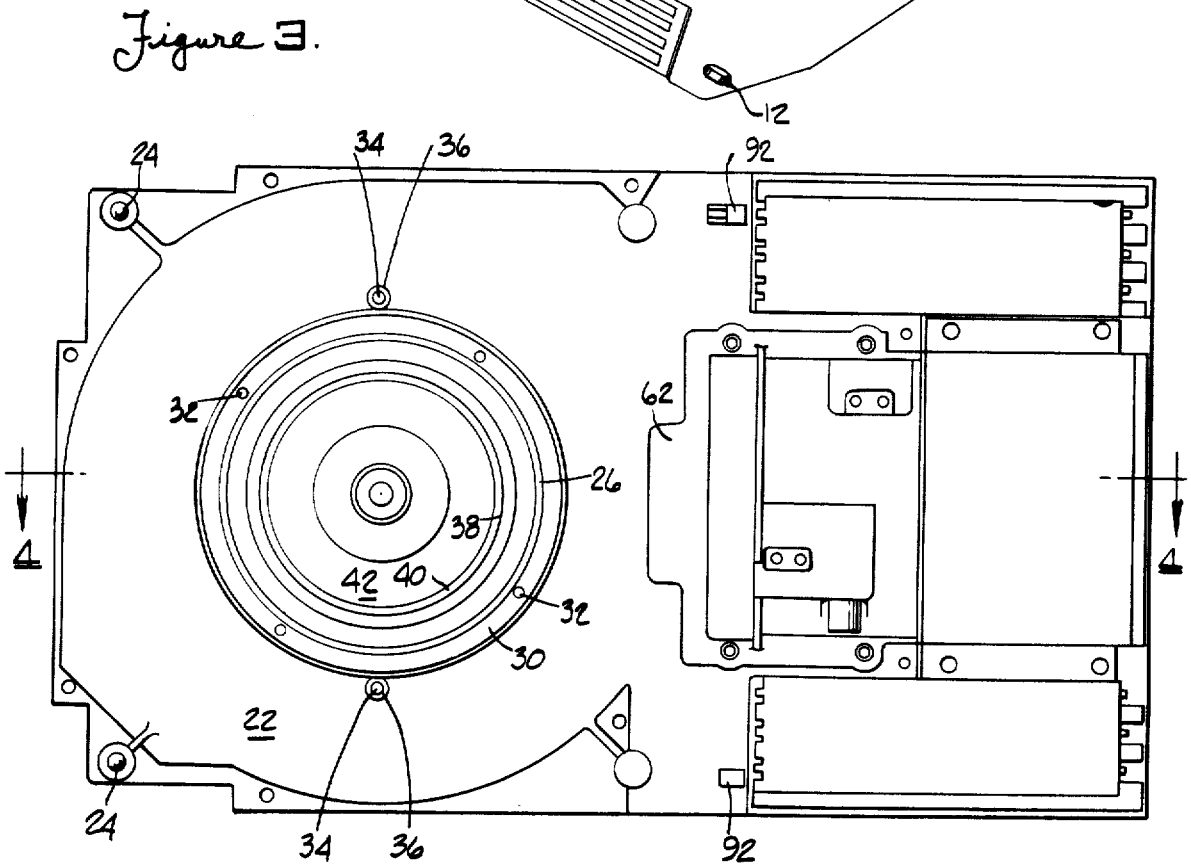

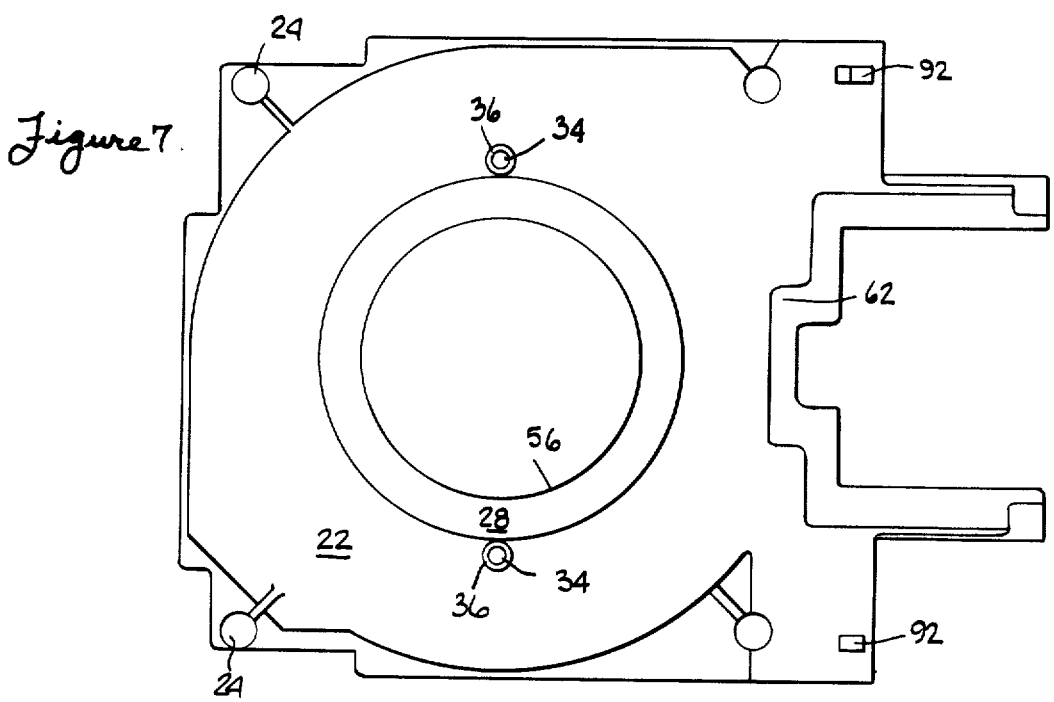
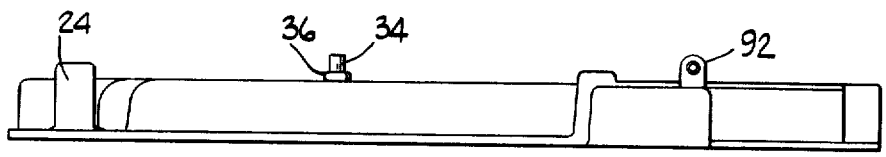
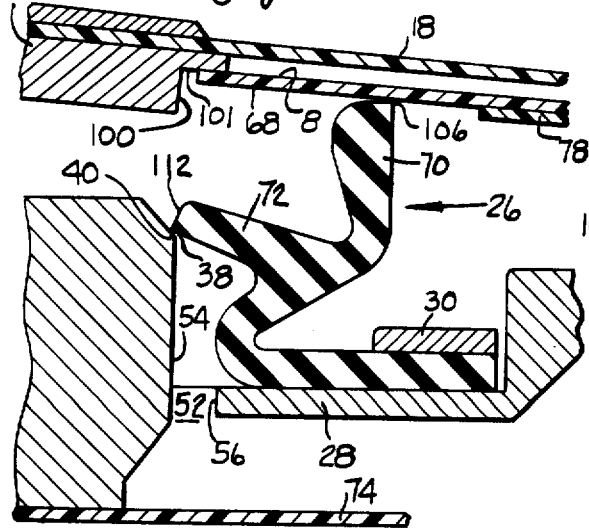
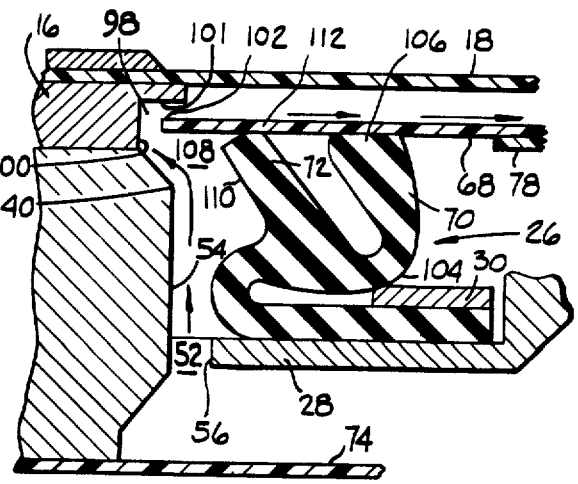

APPARATUS AND METHOD FOR PROTECTING DISKS IN A COMPUTER PERIPHERAL SYSTEM

FIELD OF THE INVENTION

This invention lies in the field of computer technologies and provides apparatus and method for protecting disks in a computer peripheral system from contamination when the system is or is not in operation and yet allowing for purging air flow around the disks during operation of the system.

BACKGROUND OF THE INVENTION

In the field of computer peripheral systems using fixed and removable disks, such as in a disk drive subsystem, it is desirable to locate these disks and the components for using them within a housing. In order to preserve the information on the disks, the disks should be protected in the system both when not in use and when in use. Thus, it is desirable to provide positive protection for a fixed disk located in the system from contamination when the system is not in use and also to prevent the clean air in the housing from leaking out into the atmosphere. Also, it is desirable to provide positive protection for the fixed disk from contamination during insertion and removal of the cartridge.

To protect the information on the fixed and removable disks during operation of the system, a clean room atmosphere should be provided for the disks. This is accomplished by using a purging air flow through the system. The apparatus for filtering and cleaning the purging air, for applying sufficient pressure to move the purging air, to provide proper flow paths for the purging air over the surfaces of the disks and providing positive protection for the purging air flow from contamination, are provided in one unit. A combination of elements providing the proper seals both when the computer system is not in operation and when the computer system is in operation and providing for the flow of purging air while protecting the purging air from contamination has long been sought for.

It is an object of this invention to provide positive protection for a fixed disk from contamination when a computer peripheral system using a fixed disk is not in operation.

It is another object of this invention to provide positive protection for both the fixed disk and a removable disk from contamination when a computer peripheral system using a fixed disk and a removable disk is in operation.

It is a further object of this invention to facilitate providing a clean room atmosphere for fixed and removable disks while the computer peripheral system is in operation by utilizing a purging air flow in the computer peripheral system while protecting the purging air flow from contamination.

SUMMARY OF THE INVENTION

The foregoing objects of this invention are accomplished by this invention by forming a housing having an opening therein exposing said housing to the atmosphere. A hub having a fixed disk mounted thereon is mounted for rotation in the housing. The opening in the housing comprises a first passageway formed around the hub. During non-operation of the system, means are provided to seal off this passageway to protect the fixed disk from contamination. When it is desired to operate the system, a sealed unit comprising a removable cartridge having a disk mounted for rotation therein is used to cover the opening into the housing. When the cartridge is moved into position over the opening, the bottom surface of the cartridge contacts portions of sealing means mounted in said housing to form an effective seal preventing contamination from entering into said housing from the atmosphere. At the same time, the cartridge acts on the sealing means to move the portions in sealing engagement around the hub and open the first passageway. The means mounting a disk for rotation in said cartridge are acted on to move these means into the cartridge when they contact the hub and at the same time open a second passageway extending from the housing into the cartridge. Purging air is supplied to the interior of the housing and moves through the first and second passageways into the cartridge and then from the cartridge through a filtering system back into the housing. The purging air flows adjacent to the top and bottom surfaces of both the fixed and removable disks to provide a clean room atmosphere for the fixed and removable disks.

BRIEF DESCRIPTION OF THE DRAWINGS

The foregoing and other objects, features, and advantages of the invention will be apparent from the following more particular description of preferred embodiments as illustrated in the accompanying drawings in which like reference characters refer to the same parts throughout the various views. The drawings are not necessarily to scale, emphasis instead being placed upon illustrating the principles of the invention.

FIG. 1 is a perspective view illustrating a cartridge being placed in a system;

FIG. 2 is a perspective view illustrating a cartridge for use in a system;

FIG. 3 is a top plan view of FIG. 1 with portions removed;

FIG. 7 is a top plan view of the fixed disk cover;

FIG. 8 is a side elevational view of FIG. 7;

FIG. 9 is a view in cross-section showing the seal arrangement before the cartridge is moved into its operational position; and, FIG. 10 is a view in cross-section showing the seal arrangement after the cartridge has been moved into its operational position.

DETAILED DESCRIPTION OF THE PREFERRED EMBODIMENT

Figure 4:
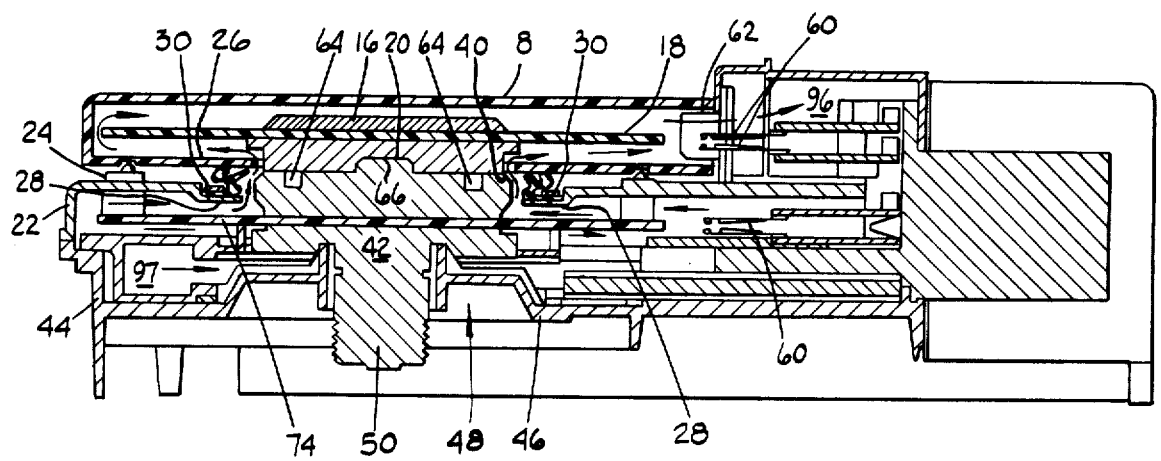
FIG. 4 is a partial sectional view taken on lines 4—4 of FIG. 3 with the cartridge added in operational position.

Referring to FIG. 1, there is illustrated generally a computer peripheral system 2 having a housing 4, a door 6 and a cartridge 8. As illustrated in FIG. 2, the cartridge 8 has a closeable opening 10 through which purging air flows, as described below. The cartridge 8 also has locating recesses 12, which recesses are only in the surface of the cartridge and do not open the cartridge to the atmosphere, for receiving locating pins. Holes 14, which are normally closed to the atmosphere, are provided in the cartridge for receiving projections which function to remove a clamp so that a disk mounted in the cartridge may be rotated. Means are provided so that the interior of the cartridge is not exposed to the atmosphere when the cartridge is or is not in operative position. As illustrated more specifically in FIG. 4, the cartridge is provided with a section 16 having a disk 18 mounted thereon and adapted for rotation in the cartridge as described below. Since as illustrated in FIG. 1, the cartridge is removable, the disk 18 is identified as a removable disk. The section 16 also has a recess 20 therein for a purpose to be described, which recess does not open the interior of the cartridge to the atmosphere.

In FIG. 3, there is illustrated a fixed disk cover 22 with locating pins 24 for cooperation with recesses 12 in the cartridge for locating the cartridge in a proper position. A seal 26 is mounted on a flange 28 in the cover 22 (see FIG. 4) by means of a clamp 30 and suitable securing means 32. Projections 34, which enter through the openings 14 in the cartridge 8 to release a clamp on the removable disk 18 so that the disk 18 may be rotated as described below, are provided with sealing means 36 to prevent contamination from entering the cartridge when the projections 34 enter the cartridge. The openings 14 are normally closed to the atmosphere by means which may be displaced by the projections 34. The innermost periphery 38 of the seal 26 in FIG. 3 is in contact with the peripheral surface 40 of the hub 42. The disk cover 22 cooperates with walls 44 and base 46 for defining a housing 48 in which the hub 42 is mounted for rotation. Suitable driving means (not shown) are provided to rotate the hub through shaft 50 illustrated in FIG. 4. As illustrated more clearly in FIG. 10, the interior of the housing 48 would communicate with the atmosphere through annular passageway 52 defined by the wall 54 of the hub 42 and the edge 56 forming an opening in the cover 22 if it were not for the action of the seal 26.

FIG. 4 illustrates the cartridge 8 in operating position over the cover 22. Means (not shown) are provided to open the door 58 covering the opening 10 so that a set of heads 60 may be moved into operating position above and below removable disk 18. A cover 62 protects the heads 60 as the cartridge is inserted. The section 16 has been pushed up into the cartridge 8 and is held in position on the hub 42 by the action of a permanent magnet 64 with a locating projection 66 on the hub 42 in position in the recess 20 in the section 16. As illustrated in FIG. 4, but shown more specifically in FIGS. 9 and 10 and as will be described more fully below, as the bottom surface 68 of the cartridge 8 contacts seal 26, it pushes lip 70 downward and moves lip 72 out of sealing engagement with the peripheral surface 40 of the hub 42. A fixed disk 74 is secured to the hub 42 for rotation therewith. A second head 60 is positioned in the housing ready to be moved into operating position above and below fixed disk 74.

Figure 5:
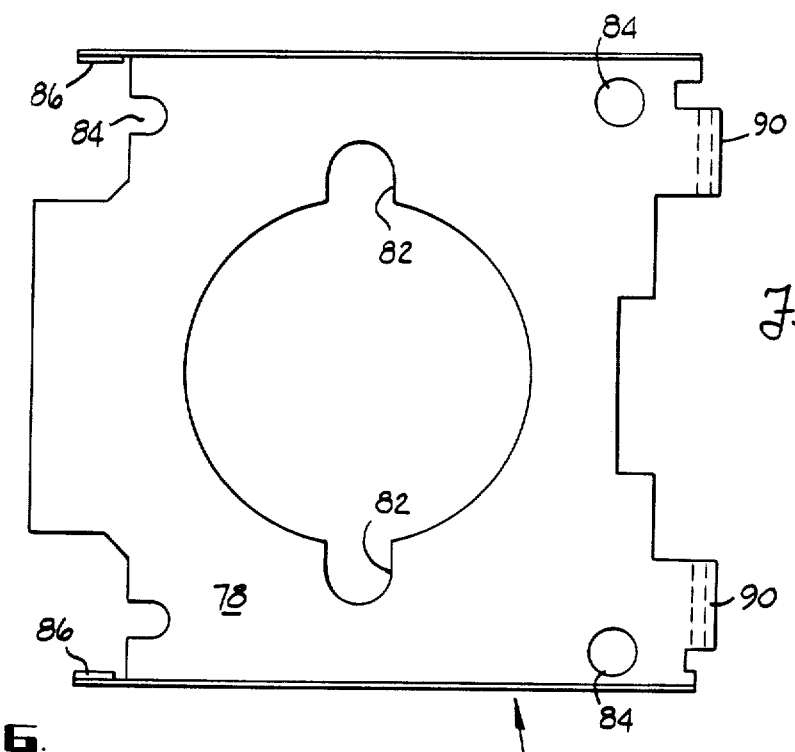
FIG. 5 is a top plan view of the holder for the cartridge with the top surface removed.
Figure 6:
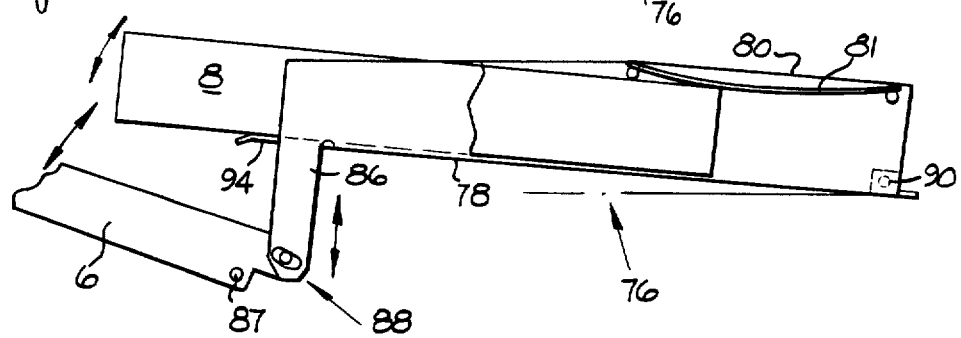
FIG. 6 is a side elevation view of FIG. 5 and also showing part of the door of FIG. 1 and the cartridge partially inserted.

The holder for the cartridge 8 is illustrated generally as 76 in FIGS. 5 and 6. The holder has a base 78 of an extent similar to cover 22 but with a top 80 (not shown in FIG. 5) that has an extent slightly less than half of the base 78. A pair of leaf springs 81 are attached to top 80 and contact the top of the cartridge adjacent opposite edges. The base 78 is provided with openings 82 for passage of the sealing means 36 and the projections 34 therethrough. The sealing means 36 contact the bottom of the cartridge to form a seal around openings 14. Also, openings 84 allows for passage of pins 24 therethrough. Depending from the base 78 are a pair of arms 86 which cooperate with the door 6 which pivots about pin 87 and operates a camming arrangement, illustrated generally at 88, to move the holder from an open position adapted to receive the cartridge 8, as illustrated in FIG. 6, to a closed position as in FIG. 4. This camming arrangement together with the springs 81 insures that the bottom 68 of the cartridge is in good sealing contact with the rib 70 of the seal 26. The base 78 has pivot bosses 90 cooperating with pivot bosses 92 on the cover 22 to provide for this movement. As viewed in FIG. 6, as the door moves to a horizontal position, the front 94 of the holder moves upwardly. In the preferred embodiment, the holder in its open position forms an angle of about 4° with the cover. The movement of the door and base is indicated by the arrows in FIG. 6. This movement is in reverse, that is, as the door moves toward the horizontal or down position the holder moves up and as the door moves toward the vertical or up and closed position, the holder moves down into the operational position.

The flow path of the purging air is illustrated completely in FIG. 4 with portions thereof more specifically illustrated in FIG. 10. As stated above, spent purged air exits from the cartridge 8 through the opening 10 after door 58 has been opened into chamber 96. The spent purging air is subjected to a filtering and cleaning action and is transferred by suitable channels into chamber 97 in the lower part of the housing. From here the fresh purging air is passed over the bottom surface of disk 74 and then over the top surface of disk 74. The purging air then moves through the passageway 52, illustrated specifically in FIG. 10, and then through the second passageway 98 comprising an annular passageway defined by the surfaces 100 and 101 of the section 16 when it is in engagement with the hub 42 and the edge 102 defining an opening in the cartridge and then into the cartridge. The purging air then flows adjacent to the bottom surface of the disk 18 and over the top surface of the disk 18 and out of the cartridge 8 through the opening 10 to complete the cycle.

The structure and operation of the seal 26 is specifically illustrated in FIGS. 9 and 10. In FIG. 9, the cartridge 8 has just been inserted into the holder 76, which is in the position illustrated in FIG. 6, and the bottom surface 68 of the cartridge 8 is just above the upstanding lip 70 of the gasket 26. The seal 26 is securely held in position on the flange 28 by the clamp 30. In this position, the lip 72 of the seal is firmly in contact with the peripheral surface 40 of the hub 42. This prevents contaminants from entering the system to contaminate fixed disk 74 both when the system is not in use and as the cartridge is being inserted.

In FIG. 10, the door 6 has been closed and the cartridge 8 has moved into operating position. As the cartridge 8 moves downwardly, the bottom surface 68 contacts the rib 70 and forces this rib downwardly. As illustrated in FIG. 10, the bottom portion 104 of the seal 26 has moved into contact with the clamp 30. While this relationship is preferred, it is not essential to the operation of the invention. It is only necessary that the contact between the upper surface 106 of the lip 70 and the bottom surface 68 of the cartridge 8 be firm enough to prevent passage of contaminating air or other materials therebetween. As the lip 70 is pushed downwardly, the lip 72 swings upwardly in an arcuate path to move out of contact with the peripheral surface 40 of the hub 42 to open a passageway 108 formed between the surface 40 of the hub 42 and the surface 110 on the lip 72.

As shown in FIG. 10, the upper surface 112 of the lip 72 has moved into contact with the bottom surface 68 of the cartridge to form another seal. While this is a preferred embodiment of the invention, it is not essential since the primary seal between the upper surface 106 of the lip 70 and the bottom surface 68 of the cartridge 8 is effective to prevent contamination from entering the system. In some instances, it may be desirable to reinforce the lip 70 with a metallic or plastic strip.

As the cartridge 8 is moving to its operating position and the lips 70 and 72 are being moved to the position illustrated in FIG. 10, the section 16 is pushed up into the cartridge 8 as it contacts the hub 42 and is positioned properly by the locating projection 66 and the recess 20. The permanent magnet 64 in the hub 42 firmly holds the section 16 in contact with the hub 42. The above movement of section 16 also opens the passageway 98. The flow of purging air now moves through passageways 52, 108 and 98 from the housing 48 into the cartridge 8 and then through the filtering and cleaning system, as described above, back into the housing. The hub 42 is rotated causing rotation of the fixed disk 74 secured thereto and rotation of the removable disk 18 through the connection between the hub 42 and the section 16. The computer peripheral system is now ready to perform its intended function.

In accordance with this invention, the seal 26 has a durometer of between about 45 to 65 Shore A and in the preferred embodiment the durometer is 55 Shore A. Durometers above 65 Shore A tend to be too stiff and below 45 Shore A the desired action of the seal as illustrated in FIGS. 9 and 10 is difficult to obtain. If a lower durometer is desirable, the lip 70 could be reinforced with a metallic or plastic strip or a metallic or plastic ring having a shape conforming to the seal 26 could be embedded therein. Although the shape of the seal is preferably that illustrated in the drawings, it is not essential. The seal may be of any configuration so long as the contact between the hub and the seal is sufficient to prevent contamination from entering into the housing when the system is not in operation and the contact between the seal and the bottom surface of the cartridge is sufficient to prevent contamination from entering into the system when it is in operation. Also, the seal must be able to move from its sealing position against the hub as the cartridge is moved downwardly to open a passageway for the purging air.

In the preferred embodiment of the invention, the bottom 78 of the cartridge holder forms an angle of approximately 4° with the horizontal surface of cover 22. However, in some instances this may be varied to accomodate different structures or modes of operation. In the preferred embodiment, the movement of the section 16 from its non-operational position in the cartridge to its operational position in contact with the hub is approximately 0.030 inch. However, this may also be varied to accomodate different structures or modes of operation.

It is also recognized that, although a computer peripheral system has been described in relation to a preferred embodiment of a disk drive subsystem, the inventive concepts may be used in other mechanisms. Thus, a seal functioning as described herein could be used in a cartridge or pack having a single or multiple disks to be protected from contamination.

While the preferred embodiments of the invention have been illustrated and described herein, it may be otherwise embodied and practiced within the scope of the following claims.

What is claimed is:

1. An apparatus for protecting two disks in a computer peripheral system from atmospheric contamination, comprising:
   a housing;
   a hub mounted within said housing for rotation therein, said hub and portions of said housing defining an opening about said hub and exposing said housing to the atmosphere;
   a first disk fixedly secured to said hub for rotation therewith;
   a second disk mounted in a cartridge removably located in said housing;
   means associated with said housing for receiving said cartridge into said housing so that said second disk can be moved into and out of an operating relationship with said first disk;
   means for protecting said first disk from atmospheric contamination when said first disk is not in an operating relationship with said second disk, said means being separate from said housing and being disposed between said first disk and said second disk when said first disk is in an operating relationship with said second disk; and
   means for protecting said first disk and said second disk from atmospheric contamination when said first disk is in an operating relationship with said second disk.

2. An apparatus, as claimed in claim 1, wherein:
   said means for protecting said first disk when said first disk is not in an operating relationship with said second disk and said means for protecting said first disk and said second disk when said first disk is in an operating relationship with said second disk include:
   portions of a single resilient sealing member.

3. An apparatus, as claimed in claim 1, wherein:
   said means for protecting said first disk when said first disk is not in an operating relationship with said second disk includes:
   a first portion of a sealing member in sealing engagement with said hub.

4. An apparatus, as claimed in claim 3, wherein:
   said means for protecting said first disk and said second disk when said first disk is in an operating relationship with said second disk includes:
   a second portion of said sealing member in sealing engagement with said cartridge.

5. An apparatus, as claimed in claim 4, further including:
   means for moving said cartridge into said housing to move said cartridge into said sealing engagement with said second portion of said sealing member and to move said first portion of said sealing member out of said sealing engagement with said hub.

6. A method for protecting two disks in a computer peripheral system from atmospheric contamination, comprising:
   mounting a hub within a housing for rotation therein;
   securing a first disk to said hub for rotation therewith;
   forming an opening surrounding said hub wherein the interior of said housing is exposed to the atmosphere;
   mounting a second disk in a cartridge for rotation therein;

providing protection means for protecting said first disk from atmospheric contamination when said first disk is not in an operating relationship with said second disk, said protection means being separate from said housing;

closing said opening surrounding said hub at least at a first location using said protection means when said first disk is not in an operating relationship with said second disk;

positioning said protection means between said first disk and said second disk when said first disk is in an operating relationship with said second disk;

receiving said cartridge into said housing to move said second disk into an operating relationship with said first disk; and protecting said first disk and said second disk from atmospheric contamination when said first disk is in an operating relationship with said second disk by closing said opening at a second location.

7. A method, as claimed in claim 6, wherein said step of positioning said protection means comprises:

securing a first portion of a sealing member in sealing engagement with a portion of the computer peripheral system; and urging a second portion of said sealing member into sealing engagement with said hub to close said opening at said first location.

8. A method, as claimed in claim 6, wherein said step of protecting said first disk and said second disk comprises:

securing a first portion of a sealing member in sealing engagement with a portion of the computer peripheral system; and urging a second portion of said sealing member into sealing engagement with said cartridge.

9. A method, as claimed in claim 6, wherein said step of protecting said first disk and said second disk comprises:

moving said cartridge into said housing wherein a portion of a sealing member is moved out of sealing engagement with said hub.

* * * * *